United States Patent
Lee et al.

(10) Patent No.: US 9,479,009 B2
(45) Date of Patent: Oct. 25, 2016

(54) POWER SYSTEM FOR ACTIVELY MAINTAINING OPERATION

(75) Inventors: Tzung-Han Lee, New Taipei (TW); Tsung-Te Lee, New Taipei (TW)

(73) Assignee: ZIPPY TECHNOLOGY CORP., New Taipei (TW)

(*) Notice: Subject to any disclaimer, the term of this patent is extended or adjusted under 35 U.S.C. 154(b) by 1056 days.

(21) Appl. No.: 13/234,625

(22) Filed: Sep. 16, 2011

(65) Prior Publication Data

US 2013/0069428 A1 Mar. 21, 2013

(51) Int. Cl.
*H02J 4/00* (2006.01)
*H02J 9/06* (2006.01)

(52) U.S. Cl.
CPC ............ *H02J 9/06* (2013.01); *Y10T 307/305* (2015.04); *Y10T 307/50* (2015.04)

(58) Field of Classification Search
CPC ............ H02J 3/005; H02J 3/38; H02J 1/10; G06F 1/263; G06F 1/28; G06F 1/266; G06F 1/24; Y10T 307/391; Y10T 307/707; Y10T 307/735
USPC .............................................. 307/29, 82, 87
See application file for complete search history.

(56) References Cited

U.S. PATENT DOCUMENTS

| | | | | |
|---|---|---|---|---|
| 3,962,611 A | * | 6/1976 | Miller | G06F 1/24 361/194 |
| 6,504,266 B1 | * | 1/2003 | Ervin | 307/29 |
| 2005/0111154 A1 | * | 5/2005 | Baughan | 361/93.1 |

FOREIGN PATENT DOCUMENTS

TW      575846      2/2004

* cited by examiner

*Primary Examiner* — Fritz M Fleming
(74) *Attorney, Agent, or Firm* — Muncy, Geissler, Olds & Lowe, P.C.

(57) ABSTRACT

A power system for actively maintaining operation includes a power supply unit electrically connected to a commercial power source, a back panel electrically connected to the power supply unit and an ON/OFF control unit. The power supply unit has an OFF state and an operating state to convert the power provided by the commercial power source for outputting. The back panel converges the output of the power supply unit and provides a driving power. The ON/OFF control unit has an input detection terminal electrically connected to the commercial power source to detect whether the commercial power source supplies power and at least one operation signal terminal to output an operation signal upon judging that the commercial power source supplies power to drive the power supply unit to enter the operating state.

8 Claims, 3 Drawing Sheets

POWER SYSTEM FOR ACTIVELY MAINTAINING OPERATION

FIELD OF THE INVENTION

The present invention relates to a power system for actively maintaining operation and particularly to a power system including a power supply unit and a back panel.

BACKGROUND OF THE INVENTION

Many large computer systems, telecommunication systems and security systems have to maintain operation for a prolonged period of time. This requirement usually cannot be met directly by AC power supply, hence providing a redundant power system with steady power and sufficient capacity becomes necessary. A conventional redundant power system commonly includes at least two power sources to supply electric power. It could consist of a plurality of power supplies, or at least one power source incorporating with at lease one battery to form a composite redundant power system, or a device using commercial power source and a power supply to meet different power requirements. In order to simultaneously control start and operation of multiple power sources and integrate output of those power sources the redundant power supply system further has a back panel connecting to the power sources. The back panel has a current path to integrate output of the power sources and a signal path to transmit signals.

Although the redundant power system can continuously provide power supply when part of power sources malfunctions or being interrupted temporarily to maintain operation of load systems, in the event that power interruption takes place for a prolonged duration or natural disasters occur, the entire power system could be shut down. In such occasions, even if commercial power has been resumed, the total redundant power system still cannot activate by itself to supply power. This causes a lot of problems to users, and also creates an idle window in which the load systems cannot function as desired.

R.O.C. patent No. 575846 entitled "Unmanned machine room protection, control and management system" provides an unmanned environment management system which includes an ECM security subsystem. The ECM security subsystem has a smart slot coupled with a network card. By linking the smart slot with a network the ECM security subsystem can be controlled at a remote site. However, it cannot restart the entire power system and management system from the remote site after they were shutdown.

Hence improvement is required on the power system to facilitate restart of the management system. A conventional power system, referring to FIG. 1, includes a plurality of power supplies 91 with output lines 910 electrically connected to a back panel 92. The power supplies 91 have front ends electrically connected to a commercial power source 1. The back panel 92 converges output power of the power supplies 91 and outputs the power through a plurality of output ports 920. Multiple loads 93 are connected respectively to the output ports 920 via a power supply line 94 for power transmission. Each power supply line 94 has a remote start switch 940. Each load 93 has a remote start signal circuit 95 to output a remote start signal after being triggered by users to set on the remote start switch 940 and awake the power supply 91 to output electric power at the same time.

In the aforesaid conventional technique the remote start switch 940 on the power supply line 94 is directly controlled by the remote start signal output by the load 93. The power supply 91 also is awoken by the remote start signal. In the event of power shutdown for a prolonged duration or natural disasters take place, after power supply is restored the power supplies 91 still cannot resume operation by themselves. System operators have to handle personally onsite. It causes a lot of problems.

SUMMARY OF THE INVENTION

In view of the aforesaid conventional problems, the object of the present invention is to provide a power system capable of resuming supplying basic power after the commercial power has been restored.

The invention provides a power system for actively maintaining operation which includes a power supply unit electrically connected to a commercial power source, a back panel electrically connected to the power supply unit and an ON/OFF control unit. The power supply unit has an OFF state and an operating state to convert the power provided by the commercial power source for outputting. The back panel converges output of the power supply unit and provides a driving power. The ON/OFF control unit has an input detection terminal electrically connected to the commercial power source to detect whether the commercial power source supplies power and at least one operation signal terminal to output an operation signal upon judging that the commercial power source supplies power to drive the power supply unit to enter the operating state.

By adding the ON/OFF control unit and input detection terminal, the power system can output the operation signal to drive the power supply unit to enter the operating state upon detecting that the commercial power source has supplied power. Therefore, as long as the commercial power source supplies power, the power system can maintain continuous operation. Even if the power is shut down for a long duration, once the commercial power source resumes supplying power, the power system can resume operation by itself. Through the technique set forth above, actively maintaining operation can be accomplished to reduce burden of system operators, and the idle period of operation interruption of the load system caused by power shutdown also can be reduced.

In an embodiment of the invention, the power supply unit includes a plurality of power supplies. The ON/OFF control unit has a plurality of operation signal terminals connected respectively to the power supplies. The back panel has at least one driving circuit to output the driving power to at least one first load. The driving circuit has a remote ON/OFF switch. The first load has a remote ON/OFF circuit to output a remote ON/OFF signal to the ON/OFF control unit. The ON/OFF control unit has at least one ON/OFF signal terminal. The ON/OFF control unit determines whether to output an ON/OFF signal via the ON/OFF signal terminal according to the remote ON/OFF signal to control ON or OFF of the remote ON/OFF switch. Furthermore, the back panel has a plurality of driving circuits, and one of the driving circuits is connected to a second load.

The second load has an information line electrically connected to the first load. The second load can be a disk unit to store an operation system compatible with the first load. The second load may also be a network card to establish signal transmission between the first load and a remote control device through a communication protocol.

Moreover, the ON/OFF control unit has a second ON/OFF signal terminal electrically connected to the second load, and can selectively output a second ON/OFF signal through the second ON/OFF signal terminal to activate the second load upon detecting that the commercial power source supplies power, or output the second ON/OFF signal through the second ON/OFF signal terminal to activate the second load upon detecting that the first load outputs the remote ON/OFF signal.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
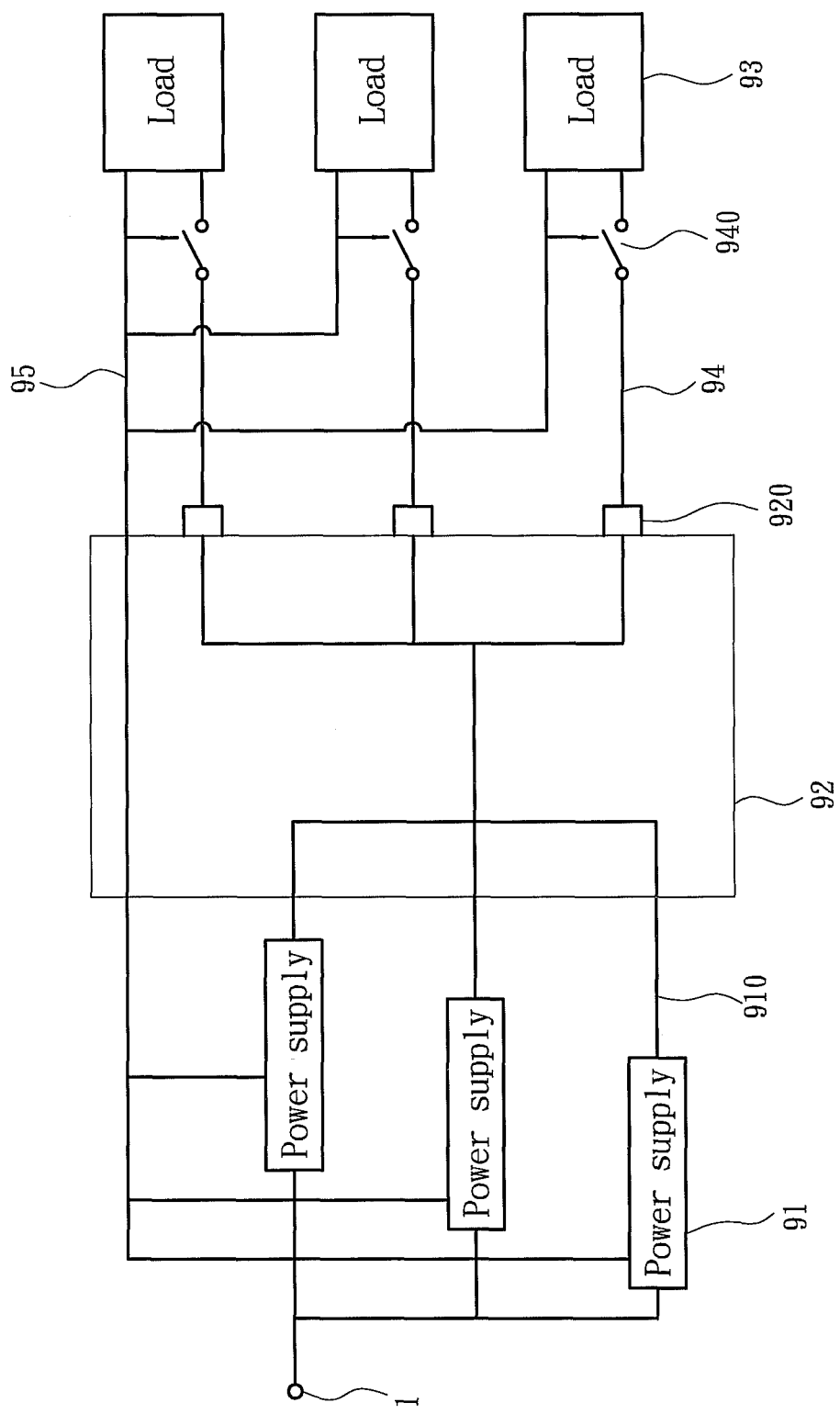
FIG. 1 is a block diagram of a conventional technique.

The present invention aims to provide a power system for actively maintaining operation. Please refer to FIG. 2 for a first embodiment of the invention. The power system includes a power supply unit 200 and a back panel 3 electrically connected to the power supply unit 200. The power supply unit 200 is electrically connected to a commercial power source 1 to get commercial power. The power supply unit 200 has an OFF state and an operating state to convert the power supplied by the commercial power source 1 for outputting. In this embodiment shown in FIG. 2, the power supply unit 200 includes a plurality of power supplies 2 each is electrically connected to the commercial power source 1 to convert and output power. The back panel 3 has a bus circuit 30 to converge the power provided by the power supply unit 200. The back panel 3 is electrically connected to one of more first loads 4 and also has a plurality of driving circuits 32 electrically connected to the bus circuit 30 to provide driving power to the first loads 4. Each driving circuit 32 has a remote ON/OFF switch 320 which can be set ON or OFF to determine whether the driving circuit 32 to provide the driving power. The power system further includes an ON/OFF control unit 31, preferably an integrated circuit, which is electrically connected to the back panel 3. The ON/OFF control unit 31 has an input detection terminal 310 and at least one operation signal terminal 311. The input detection terminal 310 is electrically connected to the commercial power source 1 to detect whether the commercial power source 1 supplies power. In the event that power provided by the commercial power source 1 is shut down or other disasters take place to result in power interruption, the power supply unit 200 also is shut down. However, when the ON/OFF control unit 31 detects that the commercial power source 1 resumes supplying power via the input detection terminal 310, the ON/OFF control unit 31 outputs an operation signal via the operation signal terminal 311 to drive the power supply unit 200 into the operating state. The ON/OFF control unit 31 may have a plurality of operation signal terminals 311 each is connected to one power supply 2 in the power supply unit 200 and provides the operation signal to drive the power supply 2 operating. Thus once the commercial power source 1 resumes supplying power, the power system can resume operation by itself. Through the technique set forth above, actively maintaining operation can be accomplished to reduce burden of system operators, and the idle period of operation interruption of the first loads 4 at the rear end caused by power shutdown also can be reduced.

Figure 2:
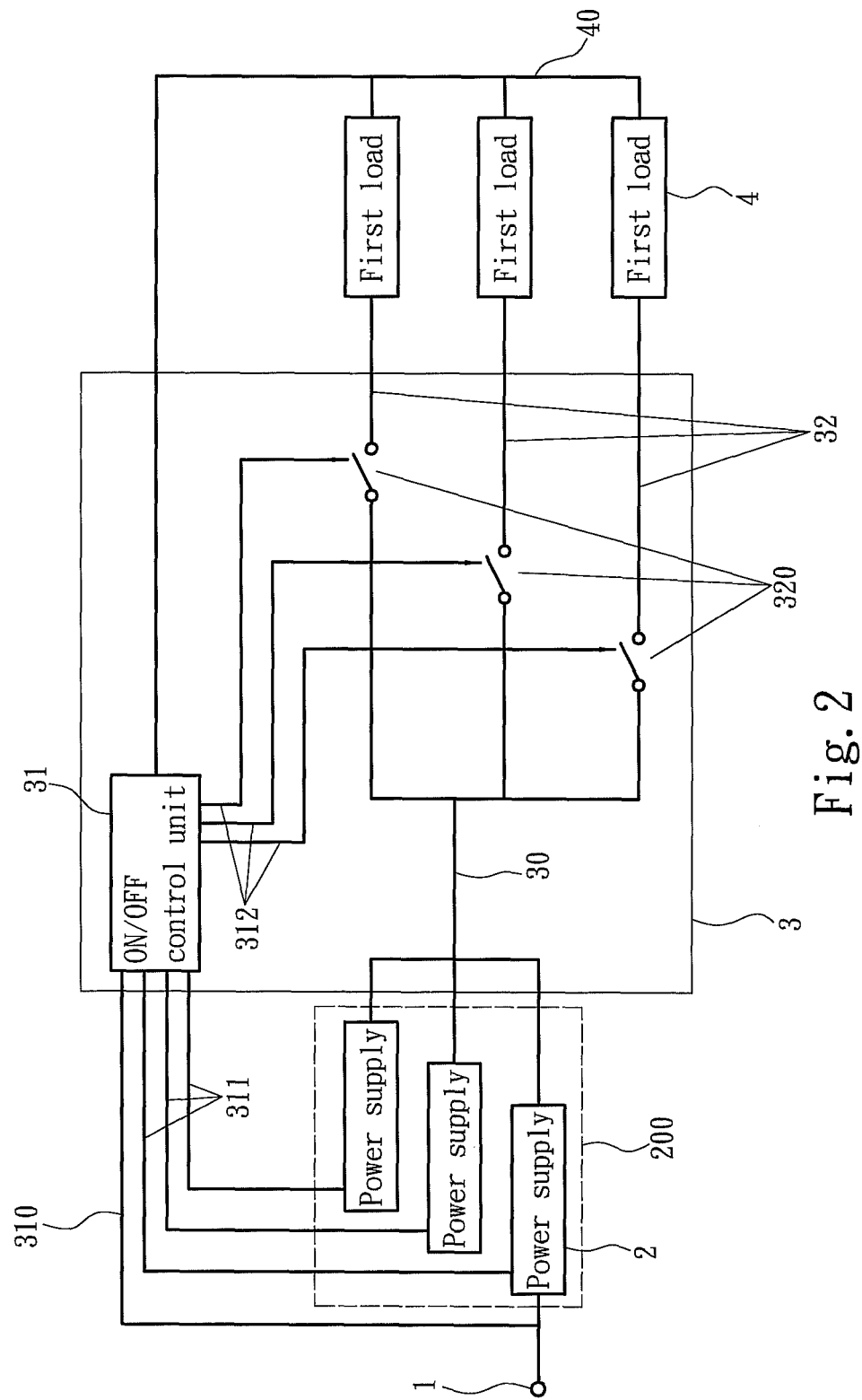
FIG. 2 is a block diagram of a first embodiment of the invention.

Also referring to FIG. 2, in order to control whether each first load 4 gets the driving power the first load 4 and the ON/OFF control unit 31 are electrically connected via a remote ON/OFF circuit 40. When the first load 4 is triggered by a user and activated, it outputs a remote ON/OFF signal via the remote ON/OFF circuit 40 to the ON/OFF control unit 31. The ON/OFF control unit 31 has a plurality of ON/OFF signal terminals 312 electrically connected to the remote ON/OFF switches 320. The ON/OFF control unit 31 outputs a switch ON/OFF signal through the corresponding ON/OFF signal terminal 312 according to the received ON/OFF signal to control ON or OFF of the corresponding remote ON/OFF switch 320 so that the first load 4 triggered by the user can get the driving power from the driving circuit 32. If the remote ON/OFF signal is analog, each first load 4 has to form electric connection with the ON/OFF control unit 31 through one remote ON/OFF circuit 40. If the remote ON/OFF signal is a digital signal, the activated first load 4 is notified to the ON/OFF control unit 31 through bit addressing. Multiple first loads 4 can share a common remote ON/OFF circuit 40 (referring to FIG. 2).

Figure 3:
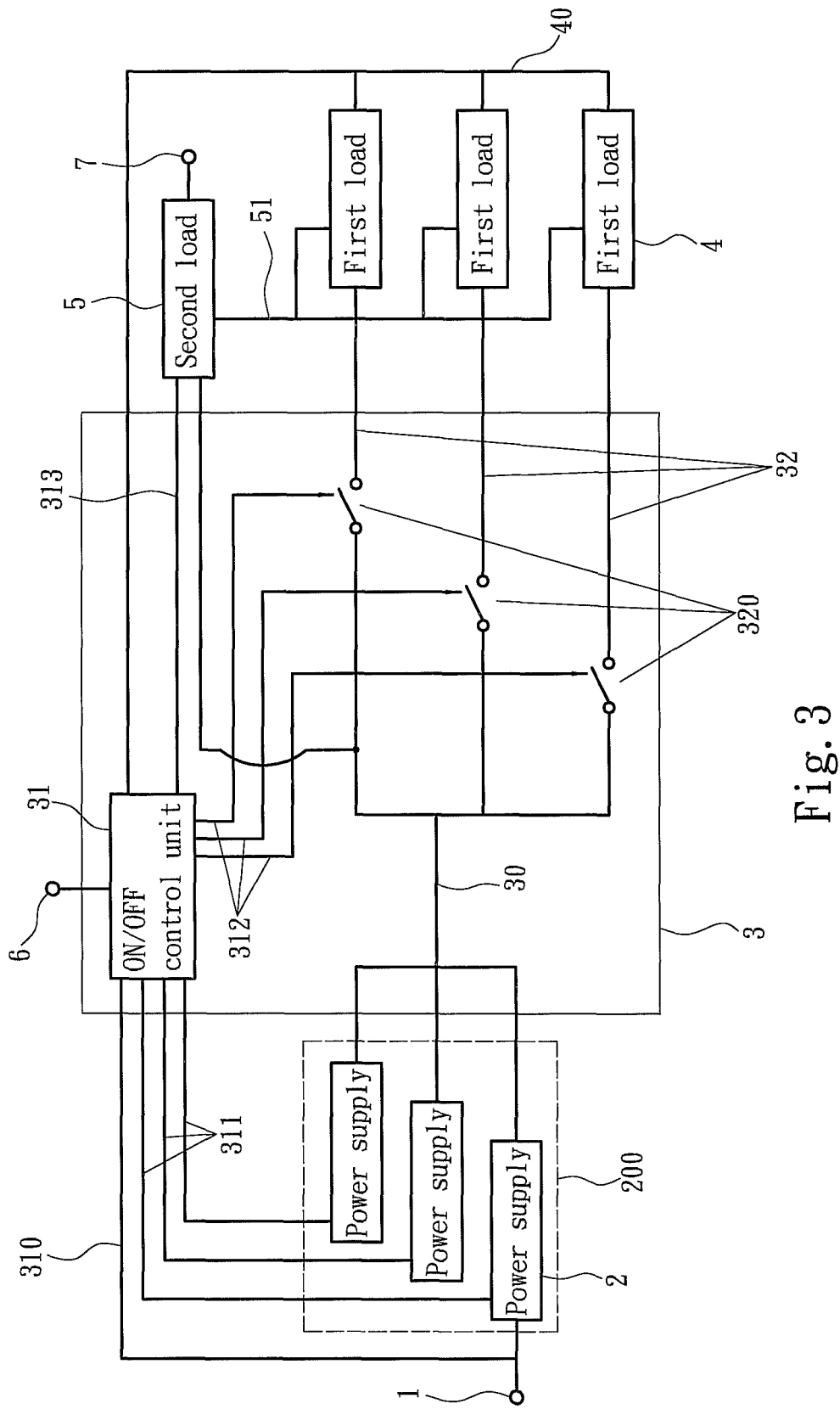
FIG. 3 is a block diagram of a second embodiment of the invention.

FIG. 3 illustrates a second embodiment which differs from the first embodiment by adding a second load 5 on the circuit structure. It also has a plurality of driving circuits 32 on the back panel 3. One of the driving circuits 32 is electrically connected to the second load 5 without the remote ON/OFF switch 320 previously discussed. The ON/OFF control unit 31 has a second ON/OFF signal terminal 313 electrically connected to the second load 5, and can output a second ON/OFF signal via the second ON/OFF signal terminal 313 to activate the second load 5 upon detecting that the commercial power source 1 supplies power. Namely, when the commercial power source 1 supplies power, the second load 5 is directly activated. Another alternative is the ON/OFF control unit 31 can select to output the second ON/OFF signal via the second ON/OFF signal terminal 313 to activate the second load 5 upon detecting that the first load 4 outputs the remote ON/OFF signal. Namely while the first load 4 is triggered and activated, the second load 5 also is activated at the same time. The ON/OFF control unit 31 can pre-save the aforesaid two modes to activate the second load 5. The ON/OFF control unit 31 further has a mode selection terminal 6 which can be triggered by system operators to select the mode of activating the second load 5. The second load 5 can have an information circuit 51 electrically connected to the first load 4. The second load 5 may be formed in different embodiments, such as a disk unit to store an operating system compatible with the first load 4, or a network card connecting to a network terminal 7. The network card can establish signal transmission between the first load 4 and a remote control device via a communication protocol. The first load 4 can be a motherboard, alarm equipment, video camera, audio recorder, traffic control equipment or the like.

By means of the technique set forth above, after the power system has detected that the commercial power source 1 supplies power, it outputs an operation signal to drive the power supply unit 200 to enter an operating state, and also drive the first load 4 and second load 5 which are in different types. Hence once the commercial power source 1 supplies power, the power system can maintain continuous operation. Even if the power is shut down for a long duration, once the commercial power source 1 resumes supplying power, the power system resume operation by itself. Through the technique set forth above, actively maintaining operation can be accomplished to reduce burden of system operators, and the idle period of operation interruption of the first load 4 and second load 5 caused by power shutdown can also be reduced.

While the invention has been described by means of specific embodiments, numerous modifications and variations could be made thereto by those skilled in the art without departing from the scope and spirit of the invention set forth in the claims.

In summation of the above description, the present invention provides a significant improvement over the conventional techniques and complies with the patent application requirements, and is submitted for review and granting of the commensurate patent rights.

What is claimed is:

1. A power system for actively maintaining operation, comprising:

a power supply unit which is electrically connected to a commercial power source and includes an OFF state to stop operating while the commercial power source is shut down for a long duration and an operating state to convert electric power provided by the commercial power source for outputting;

a back panel electrically connected to the power supply unit to converge the output of the power supply unit and provide a driving power; and an ON/OFF control unit which is electrically connected to the back panel and includes an input detection terminal electrically connected to the commercial power source to detect whether the commercial power source supplies power and at least one operation signal terminal to output an operation signal upon judging that the commercial power source resupplies the power to drive the power supply unit to enter the operating state from the OFF state, wherein the back panel outputs the driving power to at least one first load through at least one driving circuit which includes a remote ON/OFF switch, the first load including a remote ON/OFF circuit to send a remote ON/OFF signal to the ON/OFF control unit, the ON/OFF control unit including at least one ON/OFF signal terminal and determining whether to send a switch ON/OFF signal through the ON/OFF signal terminal according to the remote ON/OFF signal to control ON or OFF of the remote ON/OFF switch.

2. The power system of claim 1, wherein the power supply unit includes a plurality of power supplies, the ON/OFF control unit including a plurality of operation signal terminals connecting respectively to the power supplies.

3. The power system of claim 1, wherein the back panel includes a plurality of driving circuits, one of the driving circuits being electrically connected to a second load.

4. The power system of claim 3, wherein the second load includes an information circuit to electrically connect to the first load.

5. The power system of claim 4, wherein the second load is a disk unit which stores an operating system compatible with the first load.

6. The power system of claim 4, wherein the second load is a network card which establishes signal transmission between the first load and a remote control device via a communication protocol.

7. The power system of claim 3, wherein the ON/OFF control unit includes a second ON/OFF signal terminal electrically connected to the second load and outputs a second ON/OFF signal via the second ON/OFF signal terminal to activate the second load upon detecting that the commercial power source supplies the power.

8. The power system of claim wherein the ON/OFF control unit includes a second ON/OFF signal terminal electrically connected to the second load and outputs a second ON/OFF signal via the second ON/OFF signal terminal to activate the second load upon detecting that the first load outputs the remote ON/OFF signal.

* * * * *